(12) United States Patent
Choi

(10) Patent No.: US 12,365,542 B2
(45) Date of Patent: Jul. 22, 2025

(54) SERVER FOR ALLOCATING ROBOT TO PICKING ZONE IN PROCESS OF MANAGING PLURALITY OF ORDERS SIMULTANEOUSLY, AND SYSTEM THEREOF

(71) Applicant: TWINNY CO., LTD., Daejeon (KR)

(72) Inventor: Eun Sol Choi, Daejeon (KR)

(73) Assignee: TWINNY CO., LTD., Daejeon (KR)

( * ) Notice: Subject to any disclaimer, the term of this patent is extended or adjusted under 35 U.S.C. 154(b) by 0 days.

(21) Appl. No.: 18/858,667

(22) PCT Filed: Jun. 18, 2024

(86) PCT No.: PCT/KR2024/008378
§ 371 (c)(1),
(2) Date: Oct. 21, 2024

(87) PCT Pub. No.: WO2025/127283
PCT Pub. Date: Jun. 19, 2025

(65) Prior Publication Data
US 2025/0197119 A1    Jun. 19, 2025

(30) Foreign Application Priority Data

Dec. 14, 2023 (KR) .................. 10-2023-0182347

(51) Int. Cl.
*G06F 7/00* (2006.01)
*B65G 1/137* (2006.01)
(Continued)

(52) U.S. Cl.
CPC .......... *B65G 1/1373* (2013.01); *G05D 1/644* (2024.01); *G05D 1/667* (2024.01); *G05D 1/69* (2024.01);
(Continued)

(58) Field of Classification Search
CPC ...... B65G 1/1373; G05D 1/644; G05D 1/667; G05D 1/69; G05D 2105/20; G05D 2107/70
(Continued)

(56) References Cited

U.S. PATENT DOCUMENTS

2023/0004926 A1* 1/2023 Ikeda .................. G06Q 10/083
2023/0161827 A1* 5/2023 Bonnell ............. G06F 16/9537
707/724

(Continued)

FOREIGN PATENT DOCUMENTS

JP          2022-033095 A     2/2022
KR  10-2021-0016464 A     2/2021
(Continued)

*Primary Examiner* — Yolanda R Cumbess
(74) *Attorney, Agent, or Firm* — Rabin & Berdo, P.C.

(57) ABSTRACT

A method of operating a server is disclosed. The operation method of the disclosure, includes: identifying, by an product management module, a plurality of orders including a quantity of delivery item and a storage location of the delivery item; identifying, by a destination management module, a plurality of picking zones for loading each delivery item based on the storage location of the delivery item included in each of the plurality of orders; and selecting, by a task allocation module, at least one picking zone among the plurality of picking zones based on at least one of the quantity of delivery item matched to each of the plurality of picking zones, the number of picking stations included in each of the plurality of picking zones, and the location of the picking stations included in each of the plurality of picking zones.

14 Claims, 6 Drawing Sheets

(51) Int. Cl.
   *G05D 1/644*   (2024.01)
   *G05D 1/667*   (2024.01)
   *G05D 1/69*    (2024.01)
   *G05D 105/20*    (2024.01)
   *G05D 107/70*    (2024.01)

(52) U.S. Cl.
   CPC ..... *G05D 2105/20* (2024.01); *G05D 2107/70* (2024.01)

(58) Field of Classification Search
   USPC .................................................. 700/213–216
   See application file for complete search history.

(56) References Cited

U.S. PATENT DOCUMENTS

2023/0399177 A1* 12/2023 Lee .................. G06Q 10/06316
2024/0384995 A1* 11/2024 Nellore ................ G01C 21/383

FOREIGN PATENT DOCUMENTS

| | | |
|---|---|---|
| KR | 10-2383648 B1 | 4/2022 |
| KR | 10-2425106 B1 | 7/2022 |
| KR | 10-2022-0166367 A | 12/2022 |
| KR | 10-2023-0046382 A | 4/2023 |
| KR | 10-2576979 B1 | 9/2023 |
| KR | 10-2023-0141065 A | 10/2023 |
| KR | 10-2023-0162129 A | 11/2023 |
| WO | WO-2022043573 A1 * | 3/2022 ............. B65G 1/137 |

\* cited by examiner

SERVER FOR ALLOCATING ROBOT TO PICKING ZONE IN PROCESS OF MANAGING PLURALITY OF ORDERS SIMULTANEOUSLY, AND SYSTEM THEREOF

TECHNICAL FIELD

The present disclosure relates to any one server or system that controls a plurality of robots that load and move a shipment, and more particularly, to a server or system that allocates robots for each picking zone for effective loading (picking) of a shipment.

BACKGROUND ART

In the case of the conventional logistics center, it wants to load and transport workers using robots, but as a result of assignment of tasks for each robot, the unit order was not resolved at once, or the continuity of workers was reduced, resulting in a longer worker moving line, and the effectiveness was reduced.

Prior Arts

Patent Application Publication No 10-2425106 (product picking system and its picking method for a fulfillment logistics center)

DISCLOSURE OF INVENTION

Technical Problem

The present disclosure provides a method of operating a server that maximizes a picking efficiency of a robot by allocating each robot for each picking zone that can store a plurality of delivery item.

The purposes of the present disclosure are not limited to the aforementioned purposes, and other objects and advantages of the present disclosure, which are not mentioned, can be understood by the following description and will be more clearly understood by the embodiments of the present disclosure. It will be easily understood that the objectives and advantages of the present disclosure can be realized by the means shown in the claims and combinations thereof.

Solution to Problem

A method of operating a server according to an embodiment of the present disclosure includes: identifying, by an product management module, a plurality of orders including a quantity of delivery item and a storage location of the delivery item; identifying, by a destination management module, a plurality of picking zones for loading each delivery item based on the storage location of the delivery item included in each of the plurality of orders; and selecting, by a task allocation module, at least one picking zone among the plurality of picking zones based on at least one of the quantity of delivery item matched to each of the plurality of picking zones, the number of picking stations included in each of the plurality of picking zones, and the location of the picking stations included in each of the plurality of picking zones.

The method of operating the server may include identifying, by the robot management module, at least one robot which is waiting based on the state information of the robot received from the robot control system. In addition, the method of operating the server may include assigning, by the task allocation module, the identified at least one robot to the selected at least one picking zone.

The selecting of the at least one picking zone may include selecting at least one first picking zone among the plurality of picking zones according to the quantity of delivery item stored in a storage position matched to each of the plurality of picking zones among the delivery item included in the plurality of orders.

In this case, the selecting of the at least one picking zone may include selecting at least one second picking zone among the at least one first picking zone based on the number of picking stations included in each of the at least one first picking zone. Alternatively, the selecting of the at least one picking zone may include calculating an average distance of the identified at least one robot for each of the at least one first picking zone, and selecting at least one second picking zone from among the at least one first picking zone based on the average distance calculated for each of the at least one first picking zone.

Meanwhile, selecting the at least one picking zone may include selecting at least one first picking zone among the plurality of picking zones based on the number of picking stations included in each of the plurality of picking zones.

In this case, the selecting of the at least one picking zone may include selecting at least one second picking zone from the at least one first picking zone according to the quantity of delivery item stored in a storage position matched to each of the at least one first picking zone among the delivery item included in the plurality of orders. Alternatively, the selecting of the at least one picking zone may include calculating an average distance of the identified at least one robot for each of the at least one first picking zone, and selecting at least one second picking zone among the at least one first picking zone based on the average distance calculated for each of the at least one first picking zone.

Meanwhile, the selecting of the at least one picking zone may include selecting at least one first picking zone including a picking station having the farthest distance to the waiting zone based on the location of the picking station included in each of the picking zones of the number of bags when the identified at least one robot is a plurality of robots and is located in one waiting zone.

In this case, the selecting of the at least one picking zone may include selecting at least one second picking zone among the at least one first picking zone according to the quantity of delivery item stored in a storage position matched to each of the at least one first picking zone among the delivery item included in the plurality of orders. Alternatively, the selecting of the at least one picking zone may include selecting at least one second picking zone among the at least one first picking zone based on the number of picking stations included in each of the at least one first picking zone.

Meanwhile, the allocating of the identified at least one robot may include selecting at least one robot closest to the picking station included in the selected at least one picking zone among the identified at least one robot and allocate the selected robot to the selected at least one picking zone.

Alternatively, the allocating of the identified at least one robot may include selecting at least one robot having the largest residual battery capacity among the identified at least one robot and allocating the selected robot to the selected at least one picking zone.

Meanwhile, the selecting of the at least one picking zone may include selecting at least one picking zone among the plurality of picking zones based on at least one of the quantity of delivery item matched to each of the plurality of picking zones, the number of picking stations included in each of the plurality of picking zones, and the location of the picking stations included in each of the plurality of picking zones when the total quantity of delivery item that may be loaded by the identified at least one robot is larger than the total quantity of delivery item included in the plurality of orders according to the generation order of the plurality of orders.

Advantageous Effects of Invention

The server operating method according to the present disclosure has the advantage of being able to operate efficient robots of a space concept by allocating each robot based on a picking zone related to one or more orders. In particular, in that the location of each picking zone and the number of picking stations included in each picking zone are different, a flexible space utilization and smooth loading operation according to the situation of the robot can be performed.

MODE FOR THE INVENTION

Figure 1:
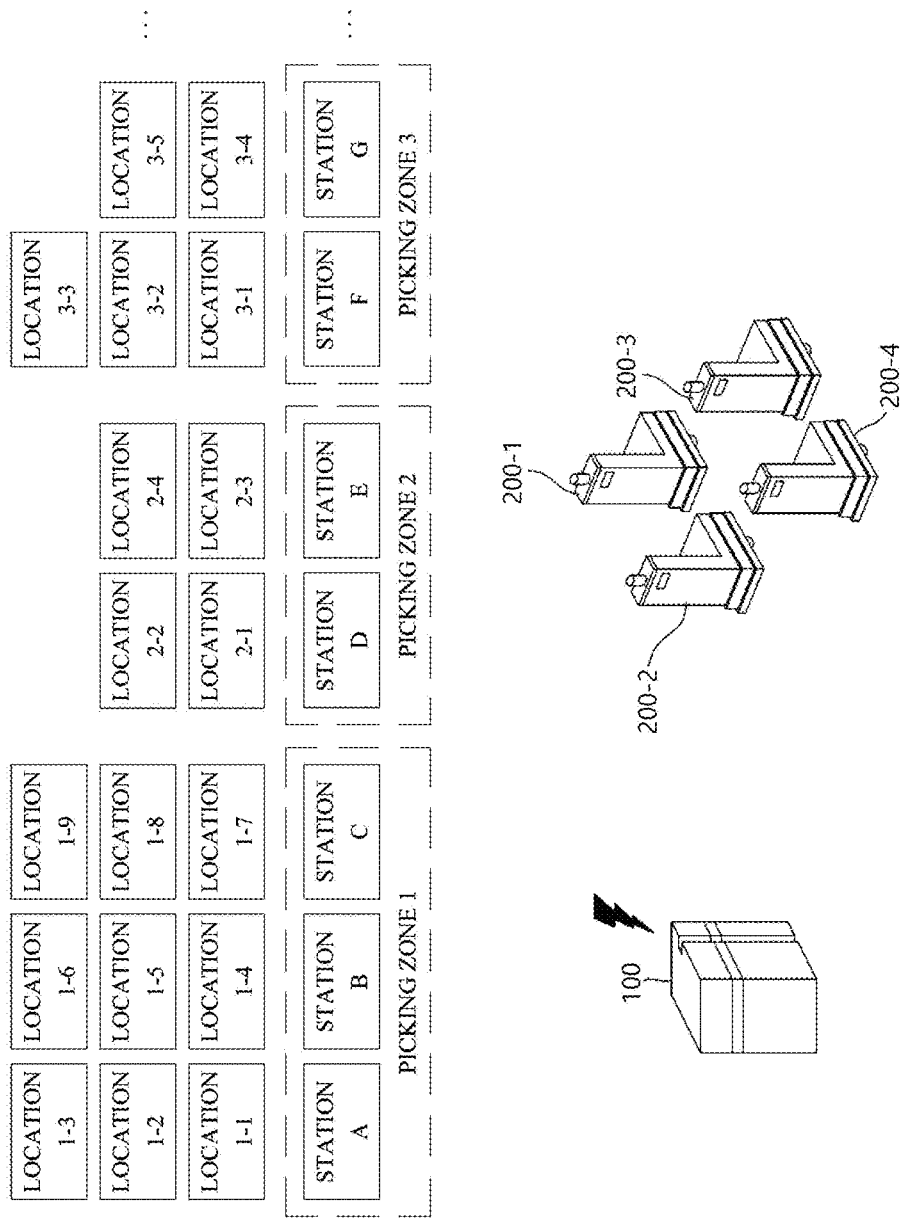
FIG. 1 is a diagram for explaining a method of an operation of a server according to an embodiment of the present disclosure for allocating each robot for each picking zone within an operating environment of each robot that stops and loads delivery item in a picking zone matched to various storage locations.

Before explaining this disclosure in detail, the description methods of the specification and the drawings will be described.

First, terms used in this specification and claims were selected by considering the functions in various embodiments of the present disclosure. However, these terms may vary depending on the intentions of those skilled in the art, legal or technical interpretation, and the emergence of new technologies. In addition, some terms include terms selected by the applicant. These terms may be interpreted in the meaning defined in this specification, and unless specific terms are defined, they may be interpreted based on the overall description of this specification and ordinary skill in the art.

In addition, the same reference numerals or symbols described in the drawings attached to the present specification indicate parts or components that perform substantially the same functions. For convenience of explanation and understanding, the same reference numerals or symbols are used in different embodiments. In other words, even if all of the components having the same reference numerals are illustrated in the plurality of drawings, it is to mean that the plurality of drawings represent one embodiment.

In addition, in the present specification and claims, terms including ordinal numbers such as "first," "second," and the like may be used to distinguish between elements. These ordinal numbers are used to distinguish the same or similar components from each other, and the meaning of the term should not be interpreted limited by the use of these ordinal numbers. For example, components combined with these ordinal numbers should not limit the order of use or the order of arrangement by the numbers. If necessary, each ordinal number may be replaced and used.

In the present specification, a singular expression includes a plurality of expressions unless the context clearly dictates otherwise. In the present application, the term "include" or "consist of" is intended to designate the presence of features, numbers, steps, operations, components, parts or combinations thereof described in the specification, and it should be understood that the presence or addition of one or more other features, numbers, steps, operations, components, parts or combinations thereof is not excluded.

In an embodiment of the present disclosure, the terms "module", "unit", "part", etc., are terms for referring to a component that performs at least one function or operation, and these components may be implemented in hardware or software or may be implemented in a combination of hardware and software. In addition, a plurality of "modules," "units," "parts" and the like may be integrated into at least one module or chip and implemented as at least one processor, except when each needs to be implemented as individual specific hardware.

In addition, in the embodiment of the present disclosure, when it is said that a part is connected to another part, this includes not only direct connection but also indirect connection through other media. In addition, the meaning that a certain part includes a certain component means that it may further include other components, rather than excluding other components unless otherwise specified.

FIG. 1 is a diagram for explaining a method of an operation of a server according to an embodiment of the present disclosure for allocating each robot for each picking zone within an operating environment of each robot that stops and loads delivery item in a picking zone matched to various storage locations.

The server 100 may be implemented as an electronic device or system including one or more computers. The server 100 may communicate directly or indirectly with each robot, and based on the state of each robot, at least one task (e.g., a task) to each robot. It is possible to allocate a picking task for loading, a packing task for unloading, etc.

One or more loading boxes may be installed or loaded in the robots (e.g., 200-1, 2, 3, 4) of the present disclosure, and the robots (e.g., 200-1, 2, 3, 4) may be operated in a space including at least one picking station and at least one packing station. The space in which robots (e.g., 200-1, 2, 3, 4) are used may include a logistics center, a warehouse, etc., but is not limited thereto.

The picking zone means an area for carrying out picking in which at least one delivery item is loaded on the robot. Each picking zone may include one or more picking stations.

Referring to FIG. 1, Picking Zone 1 includes station A, B, and C corresponding to a picking station, and Picking Zone 2 includes station D and E corresponding to a picking station.

The picking station means a point or area at which the robot stops to perform picking of loading at least one delivery item to the robot. Specifically, the picking station may be adjacent to or located within a certain distance from at least one storage location in which the delivery item is stored.

One picking station may be configured to match one or more adjacent locations, and the locations matched to one picking station may be defined as a location group. For example, in FIG. 1, station a corresponding to a picking station is referred to each group of storage locations (location group) corresponding to Location 1-1, 1-2, and 1-3. On the other hand, it is also possible that one Location is matched with a plurality of picking stations.

For example, if the robot 200-1 assigned a picking task for loading the shipping stored in Location 1-1 has stopped in station A included in Picking Zone 1, unloading of the shipments may be performed by a worker or a work system (e.g., robotic arm, suction device, rail system, shipment entrance opening system, etc.), and the unloaded shipments may be packed by a worker or a work robot (e.g., robotic arm) and transported to the outside. Meanwhile, the packing station means a point or area for carrying out unloading the delivery item loaded on the robot by the above-described picking process. Unloading the delivery item may be performed by a worker or a working system, e.g., a robot arm, a suction device, a rail system. The unloaded delivery item may be transferred to the outside by a worker or a work robot, e.g., robot arm.

According to an embodiment of the present disclosure, in the process for assigning a picking task to each robot, the server 100 may assign each robot to at least one picking zone based on the storage location of the delivery items included in the plurality of generated orders.

In this case, each robot is allocated to at least one picking zone and moves to the corresponding picking zone, and the delivery items related to the picking zone may be loaded at a time. That is, one or more orders including the delivery items related to the picking zone may be performed at a time.

As a result, the movement line of each robot is set according to the picking zone, so that the movement line is simplified. And there are advantages that the task assignment/execution of each robot may be possible in preparation for various warehouse situations, e.g., the delivery items included in each currently generated order.

Hereinafter, the drawings will be described in more detail.

Figure 2:
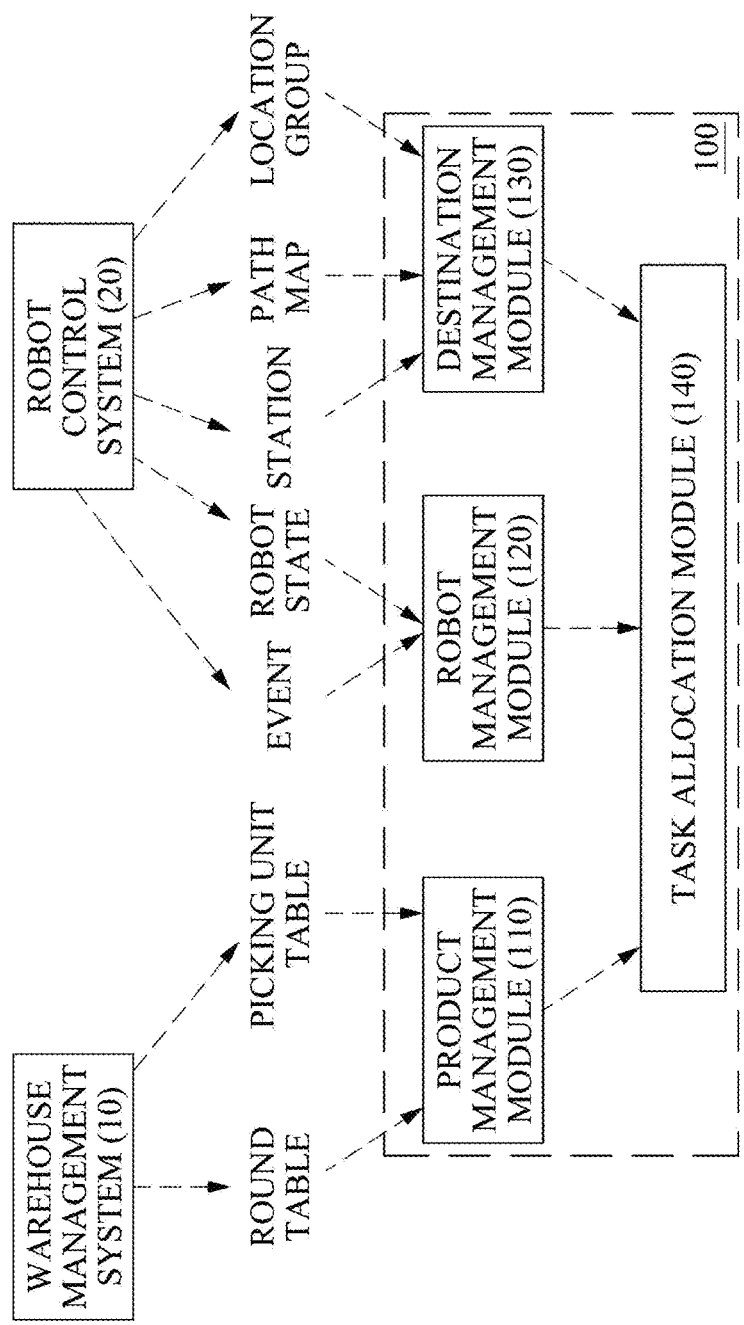
FIG. 2 is a block diagram for describing a configuration of a server or system according to an embodiment of the present disclosure.

FIG. 2 is a block diagram for establishing the configuration of a server or system according to an embodiment of the present disclosure.

Referring to FIG. 2, the server 100 may include a product management module 110, a robot management module 120, a destination management module 130, a task allocation module 140, and the like. Each of the modules corresponds to a block of functional units implemented by software and/or hardware.

The product management module 110 is a module for managing information about the delivery items included in at least one order.

Specifically, the product management module 110 may receive the types and quantities of the delivery items stored in each location, store them, and manage them in real time. To this end, the server 100 may receive information about the added delivery items from an external electronic device, e.g., external server, user terminal, and the like.

In addition, the product management module 110 may generate/manage a round/picking round corresponding to a set of orders for moving one or more delivery items to a preset least one unloading location, e.g., packing station.

For example, each round may include orders for one or more delivery items that various orderers have each ordered. That is, the order may be understood as a unit of a job group for picking. Specifically, the order may be a group of orders classified by various criteria such as a day of shipment, a delivery item place, a delivery item weight, and the like. For example, orders scheduled to ship within a certain period or received within a certain period may be included in one order. The server 100 may receive information about the generated round from an external electronic devices such as the warehouse management system 10.

Each order may include one or more than one picking unit grouped based on the same location and the same delivery item. The picking unit corresponds to the minimum unit of the task of the robot. Multiple orders may be included in one round, Multiple picking units may be included in one order, and a picking task may be allocated to one or more robots based on each of the picking units.

The item management module 110 may manage the progress state of each order and the progress state of each picking unit in real time, respectively.

The progress state of the round may include standby, progressing, and completion.

For example, if the round is not yet assigned to a specific unloading location, the progress of the round may be standby. The unloading location of the round may be set based on the type of delivery item, e.g., size, shape, and material, constituting the picking unit included in the round. For example, according to the category or classification criteria of the delivery item, the unloading location, e.g., packing station, may be preset to be divided, and the round may be assigned to each one unloading location in the generated order.

If the round is assigned to a specific unloading place and the picking unit included in the round is not completed, the progress state of the round may be in progress.

In addition, when all the picking units included in the round are completed, the progress state of the round may correspond to completion.

The progress state of the picking unit may include, for example, standby state, progressing state, a completion of a picking, and a completion of an unloading.

The standby state means a state in which picking for (at least one) delivery item included in the picking unit has not started. In a state in which the picking unit includes a plurality of delivery items, the progress of the picking unit still corresponds to standby even if some are completed and some are not completed.

The progressing state means to a state in which a picking task for a shipment included in the picking unit is assigned to the robot and the picking is in progress. The completion of the picking means to the state in which all of the shipments matched to the picking unit are loaded on the robot. And the completion of the unloading means to a state in which all of the delivery items is unloaded to unloading location, e.g., packing station, after all of the delivery items matched to the picking unit are loaded on the robot.

For example, the product management module 100 may update the progress state of each of the picking units included in each order, and set the progress state of the round according to the progress state of the picking unit.

For example, if the space in which robots operate is a logistics warehouse, the warehouse management system 10 may include at least one computer or server for managing information on the storage, round, order, picking unit, etc., of delivery item in the warehouse.

The warehouse management system 10 may generate round, orders, and picking units by collecting order information of various orderers in real time.

Specifically, information on the delivery item may be registered on the warehouse management system 10 including identification information of the ordered delivery item, type of delivery item, quantity of delivery item, expected date of delivery of the delivery item, size of the delivery item, weight of the delivery item, and attention related to handling of the delivery item. Information on delivery item may be registered according to user input, or information on each delivery item may be received in real time from an external server or database that manages delivery item work. Alternatively, the information on the delivery item may be acquired, as a result of scanning the delivery item instruction related to at least one delivery item through a scan unit of the at least one electronic device, e.g., the image sensor, the infrared sensor, the barcode sensor, etc., capable of communicating with the warehouse management system 10.

Here, the warehouse management system 10 may generate orders sequentially based on the type of delivery item, the quantity of delivery item, the location in which the delivery item is stored, and the sequence of the order, and may define a picking unit constituting each order. In this case, the picking unit may be set as a unit of quantity suitable for the loading capacity of each robot or the loading capacity of a unit loading box that may be loaded in each robot, but is not limited thereto.

As described above, information about the round, order, and picking units generated by the warehouse management system 10 may be transmitted to the server 100. At this time, the warehouse management system 10 may transmit a round table including the generated list of rounds, and a picking table including the generated list of picking units, and the picking unit table may be transmitted separately for each rank. Each round may be composed of a list or table including a plurality of orders.

The round table may include information about a unloading location matched to each round, priority of each round, and progress state of each round. The picking unit table may include information on the type of delivery item constituting each picking unit, the quantity of delivery item, and the progress state of each picking unit.

In this case, the product management module 110 may receive data, e.g., round table, order list, picking unit table, about the order, order, picking unit, etc., received from the warehouse management system 300-1. The order table, order list, and picking unit table may be stored and transmitted to the task allocation module 140.

On the other hand, unlike FIG. 2, it is possible that the warehouse management system 10 delivers only information on delivery item included in the generated order, and the round and picking unit is generated by the item management module 110 as well.

The robot management module 120 is a module for managing the state of each robot and the events generated for each robot in real time. To this end, the robot management module 120 may receive information on the state and event of the robot from an external system such as the robot control system 20.

The robot management module 120 may identify the location of each robot, the presence or absence of tasks assigned to each robot, and the progress state of tasks assigned to each robot. In addition, the robot control module 120 may identify an event generated in the robot, e.g., the occurrence of an idle (standby) state, lack of battery, saturate a loading box, completion of the loading, and fail. To this end, the robot management module 120 may communicate with each robot directly or indirectly.

The destination management module 130 is a module for managing information about a map in a space in which robots are operated, a path through which robots can move, a picking station, a packing station, and a location group. To this end, the robot management module 120 may communicate with a robot control system.

The robot control system 20 is a system for monitoring robot states and events for each robot and controlling the movement of the robot. The robot control system 20 may include at least one computer or server, and may control the robot by monitoring the state, event, etc. of each robot, and set the movement path of the robot according to the destination of each robot (set according to the task).

For example, the robot management module 120 may receive information about robot states and events from the robot control system 20, and the destination management module 130 may receive information about maps, stations, location groups, etc., of the space in which the robot operates from the robot control system 20.

Task allocation module 140 is a module for assigning each robot with a picking task and an unloading task according to the picking unit. The task allocation module 140 may be connected to the above-described item management module 110, the robot management module 120, and the destination management module 130 to exchange various information.

When a picking task is allocated to a specific robot by the task allocation module 140, the robot may move to a picking zone including a picking station matching a related location group to perform a picking unit matching the picking task. When picking (loading) is completed at the picking station, the robot may obtain a task for unloading and move to unloading location, e.g., the packing station.

In an embodiment, the task allocation module 140 may identify at least one idle state (standby state) robot based on the robot state monitored through the robot management module 120. At this time, the task allocation module 140 may select at least one round based on the number of round table and the picking unit table that are updated in real time, and allocate the corresponding robot to at least one picking zone related to a plurality of orders within the selected order.

In this case, the task allocation module 140 may identify one order associated with the picking zone to which the robot is allocated, and the destination management module 130 may identify the picking station in the picking zone that matches the location (storage location) of the delivery item included in the order. In this case, the robot control system 20 may control the robot to move to the identified destination.

In addition, the robot management module 120 may identify the event that the loading of the robot according to the picking event is completed through the robot control system 20. The task allocation module 140 may allocate a task to the robot as the loading of the robot is completed, and the task allocation module 140 may identify a preset loading site as a destination by taking into account the delivery item loaded on the robot through the destination management module 130. Similarly, the robot control system 20 may control the robot to move to the identified destination. On the other hand, when the loading of all the delivery item included in the picking unit is completed as the loading of the robot is completed, the product management module 110 may update the progress state of the picking unit from 'progress' to completion of picking'.

In addition, the robot management module 120 may identify the event that the robot has completed the download according to the download event through the robot control system 20. Here, if the picking zone or order that has been placed on the robot is not additionally confirmed, the robot management module 120 may switch the state of the robot to an idle state (standby state). In addition, the product management module 110 may update the progress state of the picking unit that has been pre-allocated to the robot to complete the unloading. At this time, the task allocation module 140 may set the destination of the idle robot as at least one standby station through the destination management module 130, and the robot may move to the standby station under the control of the robot control system 20.

Meanwhile, although in FIG. 2, the server 100 of the present disclosure is a warehouse management system.

Although it has been shown that the server 100 performs communication with the warehouse management system 10 and the robot control system 20, it is possible that the server 100 is implemented as an integrated server or system including at least one of a server that performs warehouse management and a server that performs robot control.

Meanwhile, in order to utilize each configuration illustrated in FIG. 2, the server 100 may include a hardware configuration such as a memory, a communication interface, and a processor.

The memory is a configured to store at least one instruction or data related to an operating system (OS) for controlling the overall operation of the components of the server 100 and the components of the server 100.

The memory may include non-volatile memory such as rom, flash memory, etc., and may include volatile memory configured with DRAM, etc. Also, the memory may include disks, solid state driver (SSD), etc.

The memory may include information on the generated order, order, and picking unit, and may include information on the real-time state, location, and station of the robot.

The communication interface may include a circuit, a module, a chip, and the like for communicating with at least one external device (an external server, a robot, and the like) in various wired/wireless communication methods.

The server, through the communication interface, may be connected to an external device through various networks.

The network may be a personal area network (PAN), a local area network (LAN), a wide area network (WAN), or the like depending on the area or size, and may be an intranet, an extranet, or the Internet depending on the openness of the network.

The communication interface may be connected to external devices through various wireless communication methods such as long-term evolution (LTE), LTE Advance (LTE-A), 5th Generation (5G) mobile communication, code division multiple access (CDMA), wideband CDMA (WCDMA), universal mobile telecommunications system (UMTS), wireless broadband (WiBro), Global System for Mobile Communications (GSM), Time Division Multiple Access (DMA), Wi-Fi, Wi-Fi Direct, Bluetooth, near field communication (NFC), Zigbee, etc.

Through the communication interface, the server 100 may be implemented in various external systems (e.g., external systems). The communication interface may be configured to communicate with various robots directly or indirectly, as well as communicate with warehouse management systems, robot control systems, etc. In addition, the server 100 may communicate with one or more worker terminals through a communication interface.

The processor is a component for controlling the server 100 overall. Specifically, the processor may be configured to perform the operation according to various embodiments of the present disclosure by executing at least one instruction stored in the memory while being connected to the memory.

The processor may include a general-purpose processor such as a CPU, an AP, a DSP (Digital Signal Processor), a graphics dedicated processor such as a GPU, a VPU (Vision Processing Unit), or an artificial intelligence dedicated processor such as an NPU. Artificial intelligence dedicated processors may be designed with hardware structures specialized for training or utilization of specific artificial intelligence models.

The processor may be configured to control the above-described modules 110, 120, 130, 140 implemented in software and/or hardware. The processor may be configured to cause the processor to perform at least one operation based on functions of the modules 110, 120, 130, 140 as described below.

Hereinafter, the operation of the server 100 according to various embodiments of the present disclosure will be described in more detail with reference to the drawings.

Figure 3:
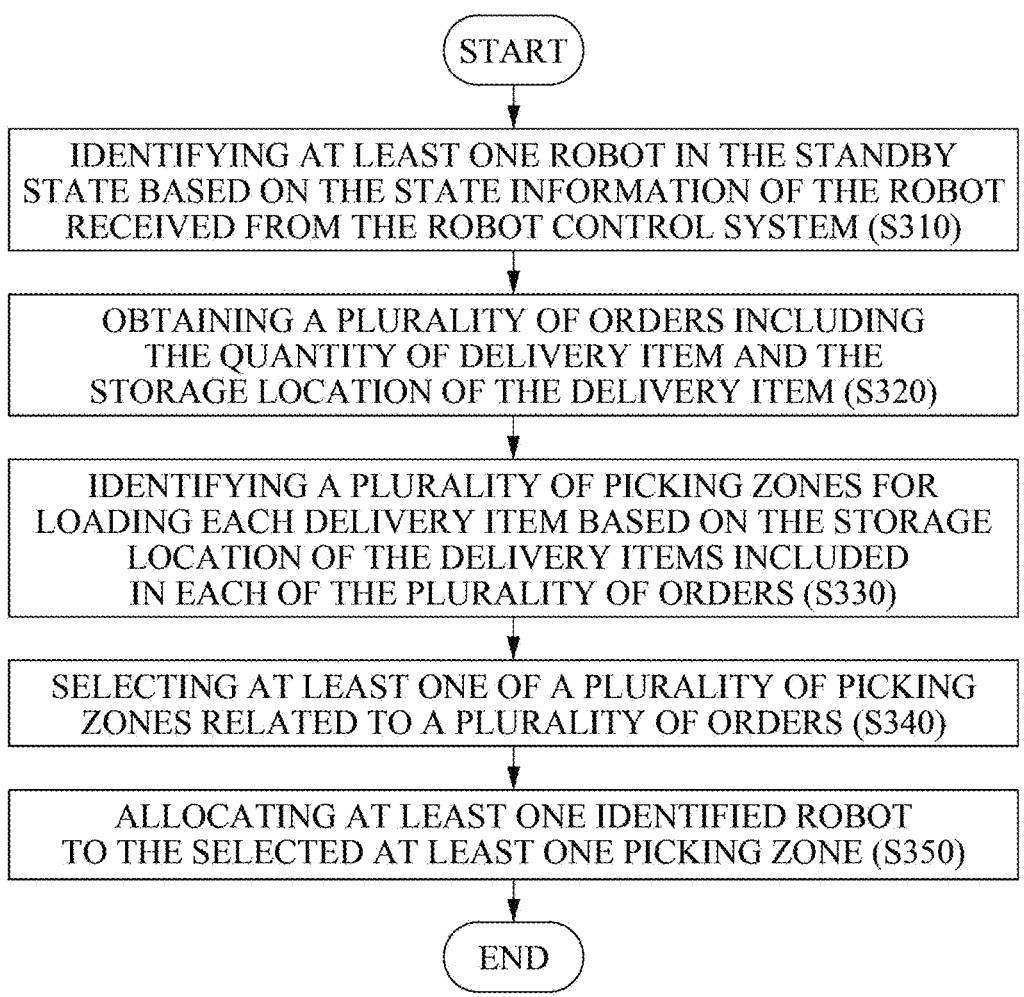
FIG. 3 is a flowchart for describing a method of an operation of a server according to an embodiment of the present disclosure.

FIG. 3 is a flowchart for describing a method of operation of a server according to an embodiment of the present disclosure.

Referring to FIG. 3, the robot management module 120 may identify at least one robot in the standby state based on the state information of the robot received from the robot control system 10 (S310).

The standby or idle state means a state in which any task, e.g., a picking task, an unloading task, is not assigned on the robot. For example, the standby or idle state means a state in which the picking task is not assigned, or a state in which the picking task and the unloading task that have been assigned are all completed. Meanwhile, the standby or idle state means a state in which the standby robot is identified, or at least one robot loading the delivery item is identified that has a loading capacity after a completion of the assigned piking units.

If at least one robot is identified as described above, the product management module 110 may obtain a plurality of orders including the quantity of delivery item and the storage location of the delivery item (S320). A plurality of orders may be included in one order in progress.

Each order may include information on the type, quantity, and storage location of the delivery item.

At this time, the destination management module 130 may identify a plurality of picking zones for loading each delivery item based on the storage location of the delivery items included in each of the plurality of orders (S330). Specifically, the destination management module 130 may identify a picking station matched to the storage location of the delivery item included in each order, and may identify a picking zone including the identified picking station. As a result, at least one picking zone may be identified per order.

In addition, the task allocation module 140 may select at least one of a plurality of picking zones related to a plurality of orders (S340).

Specifically, the task allocation module 140 may compare the loading capacity in which the robot of which state is idle state can load, e.g., the total number of delivery items, with the total number of delivery items included in the plurality of orders. Here, the volume per unit delivery item is applied to the total number and the result of the conversion may be compared with the loading capacity of the entire robot, and the limit capacity of the loading weight of each robot and the weight according to the quantity of delivery item may be compared.

If the loading capacity of the entire robot in the standby state is greater than the total number of delivery items included in the plurality of orders, the task allocation module 140 may allocate the robot equally to each picking zone so that the number of delivery items matched to each of the plurality of picking zones may be loaded.

For example, the allocation of the robot to each picking zone may be sequentially performed according to the generation sequence of the order. In this case, the faster the allocation of the robot may be performed, as the picking zone includes the faster the generation order.

On the other hand, if the loading capacity of the entire robot in the standby state is smaller than the total number of delivery items included in the plurality of orders, the robot cannot be allocated to all picking zones. In this case, the task allocation module 140 may select at least one picking zone according to at least one of various embodiments including FIGS. 4A to 4B below, and allocate at least one robot (in standby) preferentially to only the selected picking zone.

At this time, the task allocation module 140 may select at least one picking zone within a limit that does not exceed the loading capacity of the entire robot in the standby state. In other words, the larger the number of robots in the standby, the larger the number of picking zones may be selected, and in this case, the quantity of delivery item (related to multiple orders) included in individual picking zones and the loading capacity of individual robots may be considered.

Specifically, the task allocation module 140 may select at least one picking zone from among the plurality of picking zones based on at least one of the quantity of delivery item matched to each of the plurality of picking zones, the number of picking stations included in each of the plurality of picking zones, and the location of the picking stations included in each of the plurality of picking zones. The number of delivery items matched to each of the plurality of picking zones is the sum of the number of delivery items within one or more orders matched to each picking zone.

Figure 4A:
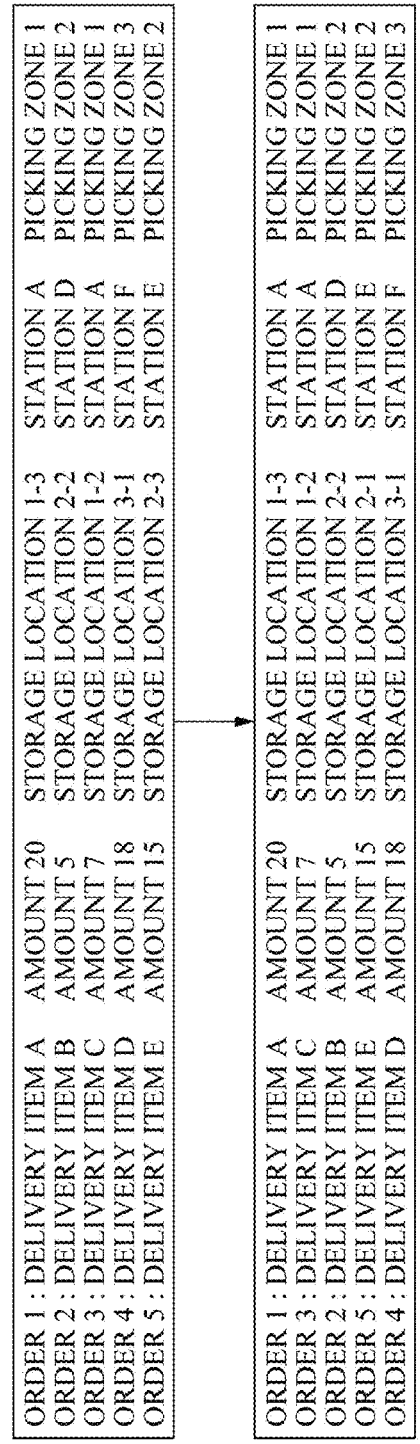
FIG. 4A is a diagram for describing a method of an operation of a server according to an embodiment of the present disclosure for sorting orders according to a picking zone matched to each order and selecting at least one picking zone according to the quantity of delivery item.

FIG. 4A is a diagram for explaining a method of an operation of a server for aligning orders according to a picking zone matched to each order and selecting at least one picking zone according to the quantity of delivery item according to an embodiment of the present disclosure.

Referring to FIG. 4A, the task allocation module 140 may align a plurality of orders according to a picking zone matched to each order. Specifically, in FIG. 4A, orders 1 and 3 matched to picking zone 1 were aligned in series, and orders 2 and 5 matched to picking zone 2 were aligned in series.

In addition, the task allocation module 140 may perform sorting according to the number of delivery items corresponding to each picking zone. For example, in FIG. 4A, since the total number of delivery items in picking zone 1 is 27 (20+7) and the total number of delivery items in picking zone 2 is 20 (5+15), orders corresponding to picking zone 1 may be ordered in higher orders than orders corresponding to picking zone 2.

In this case, the task allocation module 140 may select at least one picking zone where the number of delivery item is large. For example, in the case of FIG. 4A, a picking zone 1 having the largest amount of delivery item may be selected alone, or a picking zone 2 having the next largest amount of delivery item may be selected.

Figure 4B:
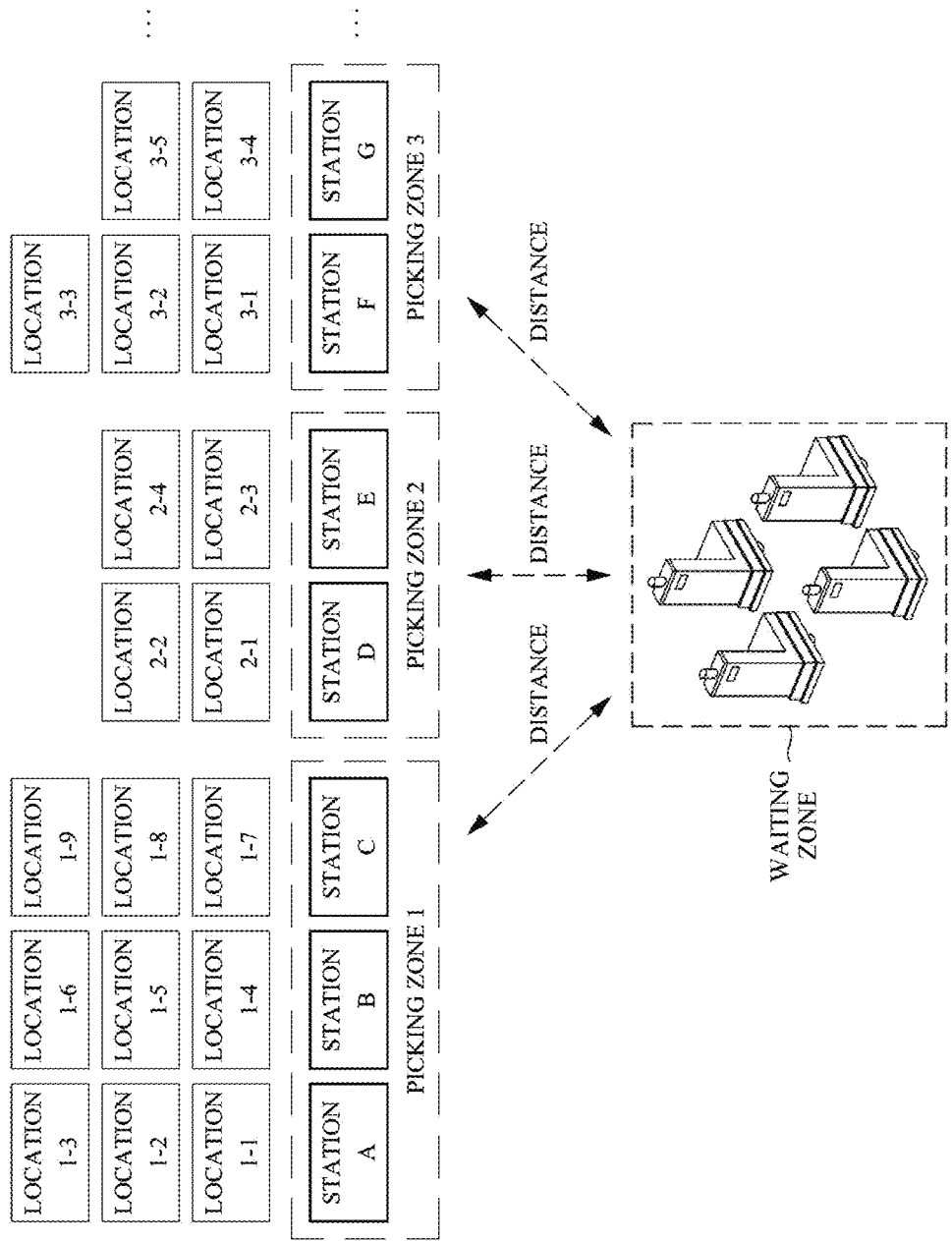
FIG. 4B is a diagram for describing a method of an operation of a server according to an embodiment of the present disclosure for selecting at least one picking zone based on the number of stations constituting the picking zone and/or the distance between the stations and each robot.

FIG. 4B is a diagram for explaining a method of an operation of a server for selecting at least one picking zone based on the number of stations constituting the picking zone and/or the distance between the stations and each robot according to an embodiment of the present disclosure.

In an embodiment, the task allocation module 140 may select at least one picking zone according to the number of stages included in each picking zone.

Specifically, the task allocation module 140 may select at least one picking zone based on the number of picking zones included in each picking zone. At this time, at least one picking zone having the largest number of picking stations may be selected. For example, in FIG. 4B, Picking Zone 1 may be selected where the number of picking stations is the largest.

In addition, as an embodiment, the task allocation module 140 may select at least one picking zone according to the location of the stations included in each picking zone. In detail, the tax allocation module 140 may calculate the average distance of at least one robot in the waiting state for each picking zone, and select at least one picking zone according to the calculated average distance. At this time, a picking zone with the largest average distance may be selected. For example, in FIG. 4B, Picking Zone 3 having the largest average distance to waiting robots may be selected.

In the process of selecting at least one picking zone (S340), various embodiments as described above are possible, and it is also possible to select a picking zone by combining two or more of the above-described embodiments.

In an embodiment, the task allocation module 140 may primarily select at least one first picking zone from among the plurality of picking zones according to the quantity of delivery item stored at the storage location matched to each of the plurality of picking zones among the delivery item included in the plurality of orders. In this case, at least one first picking zone with the largest amount of delivery item may be selected.

At this time, the task allocation module 140 may (finally) select at least one second picking zone among the at least one first picking zone based on the number of picking stations included in each of the at least one first picking zone. In this case, at least one second picking zone among the at least one first picking zone having the largest number of picking stations may be selected.

Alternatively, the task allocation module 140 may calculate the average distance of the identified at least one robot for each of the at least one first picking zone. And, the task allocation module 140 may (finally) select at least one second picking zone among the at least one first picking zone based on the average distance calculated for each of the at least one first picking zone. In this case, at least one second picking zone having the largest average distance may be selected.

In another embodiment, the task allocation module 140 may primarily select at least one first picking zone among the plurality of picking zones based on the number of picking stations included in each of the plurality of picking zones. In this case, at least one first picking zone having the largest number of picking stations may be selected.

At this time, the task allocation module 140 may (finally) select at least one second picking zone from at least one first picking zone according to the quantity of delivery item stored at the storage location matched to each of at least one first picking zone among the delivery item included in the plurality of orders. In this case, at least one second picking zone among the at least one first picking zone having the largest number of delivery items may be selected.

Alternatively, the task allocation module 140 may calculate the average distance of the identified at least one robot for each of the at least one first picking zone. At this time, the task allocation module 140 may select at least one second picking zone among the at least one first picking zone based on the average distance calculated for each of the at least one first picking zone. In this case, at least one second picking zone having the largest average distance among the at least one first picking zone may be selected.

As another embodiment, it is assumed that a plurality of robots in a standby state are located in one standby. The waiting zone corresponds to a standby area of one or more standby stations or robots including charging stations. In this case, the task allocation module 140 may select at least one first picking zone based on the location of the picking stations included in each of the plurality of picking zones. Specifically, the task allocation module 140 may select at least one first picking zone including a picking station having the longest distance to the waiting zone in which the plurality of robots (in the standby state) are located.

In this case, the task allocation module 140 may select at least one second picking zone from at least one first picking zone according to the quantity of delivery item stored at a storage location matched to each of at least one first picking zone among the delivery item included in the plurality of orders. In this case, at least one second picking zone may be selected that matches the largest amount of delivery item among the at least one first picking zone.

Alternatively, the task allocation module 140 may select at least one second picking zone among the at least one first picking zone based on the number of picking stations included in each of the at least one first picking zone. In this case, at least one second picking zone among the at least one first picking zone having the largest number of picking stations may be selected.

If at least one picking zone is selected through the process of S340 according to at least one of the above-described various embodiments, the task allocation module 140 may allocate at least one robot identified (which is in the standby state) to the at least one picking zone selected above (S350).

Specifically, the task allocation module 140 may select at least one robot closest to the picking station included in the selected at least one picking zone from the identified at least one robot (which is in the standby state), and allocate the selected robot to the selected at least one picking zone.

Alternatively, the task allocation module 140 may select at least one robot having the largest remaining battery capacity among the identified at least one robot, and allocate the selected robot according to the remaining battery capacity to the selected at least one picking zone.

The process of matching and assigning at least one robot to at least one picking zone is performed according to the quantity of delivery item matched to each picking zone, e.g., weight, volume, etc., the remaining battery capacity of each robot, and the remaining loading capacity of each robot.

It is also possible that several robots are allocated to one picking zone. However, the number of robots simultaneously allocated to one picking zone is not greater than the number of picking stations included in the corresponding picking zone. That is, the task allocation module 140 may not allocate more robots than the number of picking stations included in the picking zone to the corresponding picking zone at the same time.

For example, the task allocation module 140 may prioritize and allocate a robot having the largest remaining loading amount, e.g., weight and/or volume, among at least one robot identified in the step of S310 to a picking zone having the largest amount, e.g., weight and/or volume, of delivery item among the at least one picking zone identified in the step of S340.

For example, the task allocation module 140 may prioritize and allocate a robot with the largest remaining battery capacity among the at least one robot identified in the step of S310 to a picking zone with the farthest distance among the at least one picking zone selected in the step of S340.

For example, if the total number of picking stations included in at least one picking zone identified in the step of S340 is larger than the number of robots identified in the step of S310, the task allocation module 140 may allocate robots with the largest remaining battery capacity to stations with the largest number of picking stations. At this time, the task allocation module 140 may allocate a plurality of picking units matched to a plurality of picking stations so that the corresponding robot moves and loads a plurality of picking stations included in the same picking zone. As a result, it is possible to control the robot with the largest capacity of the remaining battery to load delivery item matched to each picking station while moving the largest number of picking stations.

As described above, if each robot is allocated to at least one picking zone associated with a plurality of orders, the task allocation module 140 may allocate a picking unit for the order of delivery item matched to the allocated picking zone to each robot.

Figure 5:
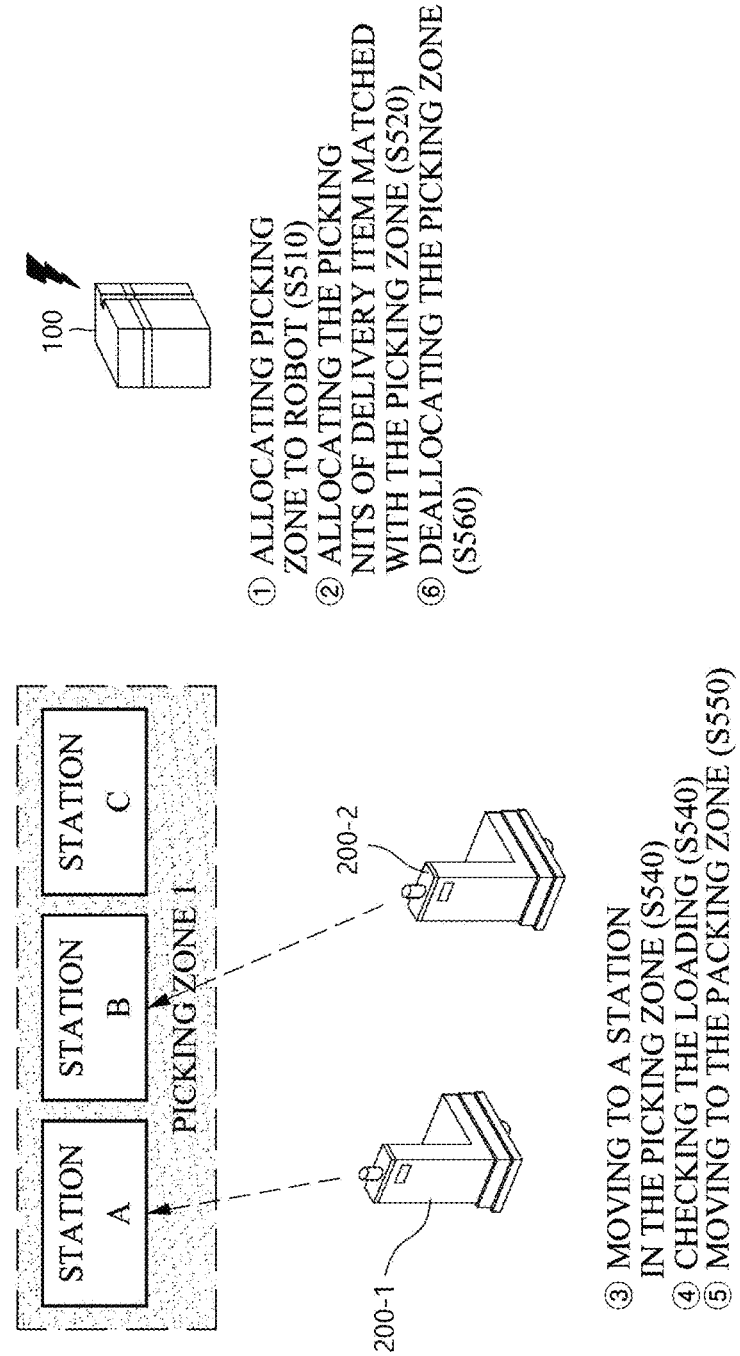
FIG. 5 is a diagram for describing a method of an operation of a server according to an embodiment of the present disclosure for controlling a loading process of a robot allocated to the picking zone.

In relation to FIG. 5, a server according to an embodiment of the present disclosure is a diagram for explaining a process of controlling a loading process of a robot assigned to a picking zone.

Referring to FIG. 5, the task allocation module 140 of the server 100 may allocate each robots 200-1 and 2 to at least one picking zone, e.g., Picking Zone 1, (S510) according to an embodiment of FIG. 3.

At this time, the task allocation module 140 may allocate the picking units of delivery item matches with the picking zone to each robot 200-1 and 2 (S520). In this case, the task allocation module 140 may set picking station in which the each robot 200-1 and 2 moves based on storage location of delivery item, e.g., Location, included in at least one order related to the corresponding picking zone.

As a result, as shown in FIG. 5, each robot 200-1 and 2 may move to different picking stations (S530).

In this case, each robot 200-1 and 2 may be subjected to a process of depositing at least one loading box for performing at least one picking unit assigned to each robot before moving to the picking station. For example, at least one loading box for loading delivery item may be loaded on each robot according to a picking unit assigned to each robot 200-1 and 2 on a setting station or standby station where various sizes of loading boxes are prepared. To this end, the information on the loading box that must be loaded in each robot, e.g., volume, shape, location in the robot, etc., may be transmitted, or as a result of the information being transmitted to each robot, each robot displays the information on the loading box, so that the worker in the field may check the displayed information and load the loading box on each robot.

However, if each robot 200-1 and 2 is already in a state in which one or more loading boxes are fixedly loaded, each robot 200-1 and 2 may move to each picking station immediately without a separate loading process for the loading box.

The task allocation module 140 may allocate not only each picking unit to each robot, but also allocate each picking unit to at least one loading box included in the robot. At this time, one loading box having a loading capacity capable of loading all the quantities of delivery item matches to the picking unit may be selected within the robot.

The robots 200-1 and 2 moved to each picking station, e.g., station A, station B, may output information on the delivery item matched to the picking unit and information on the loading box for loading the delivery item kept in the location matched to each picking station.

Specifically, the robot 200-1 may inform the arrival of the picking station, e.g., signal sound or image output, and visually and audibly output information on delivery items such as the type, quantity, and storage location of delivery items to be loaded. In addition, the robot 200-1 may visually/audibly output information on the loading box where the delivery item should be loaded, e.g., the identification number of the stack, the position of the stack in the robot, etc. As a result, a delivery item matched to the picking unit may be loaded into the loading box of the robot 200-1 by the worker.

Alternatively, a picking station, e.g., the station A, is equipped with a task system for automatically performing loading, the task allocation module 140 may transmit information about delivery item that should be loaded on the robot 200-1 and information about loadings to the task system, so that the loading of the task system on the robot 200-1 may be automatically performed.

When the loading is performed in this way, each robot 200-1 and 2 may check the loading (S540).

Specifically, the robot 200-1 may identify a completion of loading by obtaining a user input of an worker informing of, e.g., the button or touchpad control in robot 200-1.

Alternatively, the robot 200-1 may identify the completion of loading through at least one sensor provided in the robot 200-1. At this time, the weight matched to the quantity of delivery item may be sensed through the weight sensor of the robot 200-1 or the volume matched to the quantity of delivery item may be sensed through a camera or an infrared sensor.

Alternatively, a signal for notifying the completion of loading may be received from a work system that performs wireless proximity communication with the robot 200-1 or is connected by a wire.

As such, when the loading completion is identified by each robot 200-1 and 2, the task allocation module 140 may control each robot to move to a packing zone for unloading the delivery item loaded to each robot (S550). The packing zone corresponds to an area including one or more packing stations.

As a result, the task allocation module 140 may de allocation of each robot to the picking zone 1 (S560).

However, if the loading capacity of the robot 200-1 remains enough to perform the picking unit included in at least one remaining order even though the loading of the delivery item was completed in the above-described picking zone 1, the task allocation module 140 may cancel the allocation of the robot 200-1 to the picking zone 1, and may allocate at least one different picking zone to the robot 200-1 to perform the picking unit.

Meanwhile, the various embodiments described above may be implemented by combining two or more unless they are incompatible with each other.

Meanwhile, the various embodiments described above may be implemented in a computer or a similar apparatus readable recording medium using software, hardware, or a combination thereof.

According to a hardware implementation, the embodiments described in the present disclosure may be implemented using at least one of ASICs (Application Specific Integrated Circuits), DSPs (Digital Signal Processors), DSPDs (Digital Signal Processing Devices), PLDs (programmable logic devices), FPGAs (field programmable gate arrays), processors, controllers, micro-controllers, microprocessors, and other electrical units for performing the functions.

In some cases, the embodiments described herein may be implemented in the processor itself. According to software implementation, embodiments such as procedures and functions described in this specification may be implemented as separate software modules. Each of the above-described software modules can perform one or more functions and operations described herein.

Meanwhile, computer instructions or computer programs for performing processing operations in electronic devices such as robots and servers according to various embodiments of the present disclosure described above may be stored in non-transitory computer-readable media. When executed by a processor of a specific device, a computer instruction or computer program stored in such a non-transitory computer readable medium allows the specific device to perform processing operations in a server, a robot, and the like according to various embodiments described above.

The non-transitory computer readable medium refers to a medium that stores data semi-permanently and can be read by a device, rather than a medium that stores data for this short moment, such as a register, cache, memory, and the like. Specific examples of the non-transitory computer readable medium may include cd, DVD, a hard disk, a Blu-ray disk, USB, a memory card, rom, and the like.

Although the preferred embodiments of the present disclosure have been illustrated and described above, the present disclosure is not limited to the specific embodiments described above, and it is of course that various modifications and implementations can be made by those skilled in the art to which the present disclosure pertains without departing from the gist of the present disclosure from the claims, and such modifications and implementations should not be individually understood from the technical spirit and perspective of the present disclosure.

SEQUENCE LISTING FREE TEXT

100: server
110: product management module
120: robot management module
130: destination management module
140: task allocation module
200-1, 2, 3, 4: robot

The invention claimed is:
1. A method of operation of a server, the method comprising:
  obtaining, by at least one processor of the server, a plurality of orders each including a quantity of delivery items and a storage location of the delivery items;
  identifying, by the at least one processor, a plurality of picking zones each including picking stations for loading the delivery items based on the storage location of the delivery items included in each of the plurality of orders, wherein each of the picking stations corresponds to one or more storage locations of the delivery items included in the plurality of orders; and selecting, by the at least one processor, at least one picking zone among the plurality of picking zones, based on at least one of:
the quantity of delivery items matched to each of the plurality of picking zones,
a number of the picking stations included in each of the plurality of picking zones, or
a location of the picking stations included in each of the plurality of picking zones; and
assigning, by the at least one processor, at least one robot to said selected at least one picking zone to load the delivery items matched to said selected at least one picking zone.

2. The method of claim 1, wherein the selecting of the at least one picking zone comprises:
selecting at least one first picking zone among the plurality of picking zones according to the quantity of delivery items stored in a storage location matched to each of the plurality of picking zones among delivery items included in the plurality of orders.

3. The method of claim 2, wherein the at least one first picking zone includes a plurality of first picking zones, and the selecting of the at least one picking zone further comprises:
selecting at least one second picking zone among the plurality of first picking zones based on a number of picking stations included in each of the plurality of first picking zones.

4. The method of claim 2, further comprising:
identifying, by the at least one processor, at least one robot in standby based on state information of the robot received from a robot control system,
wherein the at least one first picking zone includes a plurality of first picking zones, and the selecting of the at least one picking zone further comprises:
calculating an average distance of the identified at least one robot with respect to each of the plurality of first picking zones; and
selecting at least one second picking zone among the plurality of first picking zones based on the average distance calculated with respect to each of the plurality of first picking zones.

5. The method of claim 1, wherein the selecting of the at least one picking zone comprises:
selecting at least one first picking zone among the plurality of picking zones based on a number of the picking stations included in each of the plurality of picking zones.

6. The method of claim 5, wherein the at least one first picking zone includes a plurality of first picking zones, and the selecting of the at least one picking zone comprises:
selecting at least one second picking zone among the plurality of first picking zones based on matching the quantity of delivery items stored in the storage location with a first picking zone among the plurality of first picking zones.

7. The method of claim 5, further comprising:
identifying, by the at least one processor, at least one robot in standby based on state information of the at least one robot received from a robot control system, and
wherein the at least one first picking zone includes a plurality of first picking zones, and the selecting of the at least one picking zone further comprises:
calculating an average distance of the identified at least one robot with respect to each of the plurality of first picking zones; and
selecting at least one second picking zone among the plurality of first picking zones based on the average distance calculated with respect to each of the plurality of first picking zones.

8. The method of claim 1, further comprising:
identifying, by the at least one processor, at least one robot in standby based on state information of the at least one robot received from a robot control system,
wherein the selecting of the at least one picking zone comprises:
selecting at least one first picking zone including a picking station having a farthest distance to a waiting zone based on a location of the picking station included in each of the plurality of picking zones when the identified at least one robot is a plurality of robots and is located in one waiting zone.

9. The method of claim 8, wherein the at least one first picking zone includes a plurality of first picking zones, and the selecting of the at least one picking zone comprises:
selecting at least one second picking zone among the plurality of first picking zones according to the amount of delivery items stored in a storage location matched to each of the at least one first picking zone among the delivery item included in the plurality of orders.

10. The method of claim 8, wherein the at least one first picking zone includes a plurality of first picking zones, and the selecting of the at least one picking zone comprises:
selecting at least one second picking zone among the plurality of first picking zones based on a number of picking stations included in each of the plurality of first picking zones.

11. The method of claim 1, further comprising:
identifying, by the at least one processor, at least one robot in standby based on state information of the at least one robot received from the robot control system; and
allocating, by the at least one processor, the identified at least one robot to the selected at least one picking zone.

12. The method of claim 11, wherein the identified at least one robot includes a plurality of identified robots, and the allocating of the identified at least one robot comprises:
selecting at least one robot closest to the picking stations included in the selected at least one picking zone among the plurality of identified robots; and
allocating the selected at least one robot to the selected at least one picking zone.

13. The method of claim 11, wherein the identified at least one robot includes a plurality of identified robots, and allocating of the identified at least one robot comprises:
selecting at least one robot having a largest remaining battery capacity among the plurality of identified robots; and
allocating the selected robot to the selected at least one picking zone.

14. A method of operation of a server, the method comprising:
obtaining, by at least one processor of the server, a plurality of orders each including a quantity of delivery items and a storage location of the delivery items;
identifying, by the at least one processor, a plurality of picking zones each including picking stations for loading the delivery items based on the storage location of the delivery items included in each of the plurality of orders, wherein each of the picking stations corresponds to one or more storage locations of the delivery items included in the plurality of orders; and selecting, by the at least one processor, at least one picking zone among the plurality of picking zones, based on at least one of:
   the quantity of delivery items matched to each of the plurality of picking zones,
   a number of the picking stations included in each of the plurality of picking zones,
   a location of the picking stations included in each of the plurality of picking zones; or
   a generation sequence of the plurality of orders; and
assigning, by the at least one processor, at least one robot to said selected at least one picking zone, wherein:
when a total amount of delivery items that the identified at least one robot can load is less than a total amount of delivery items included in the plurality of orders allocated to the at least one robot, the at least one picking zone is selected based on at least one of:
   the quantity of delivery items matched to each of the plurality of picking zones,
   the number of the picking stations included in each of the plurality of picking zones, and
   the location of the picking stations included in each of the plurality of picking zones; and
when the total amount of delivery items that the identified at least one robot can load is greater than the total amount of delivery items included in the plurality of orders, the at least one picking zone is selected based on the generation sequence of the plurality of orders.

\* \* \* \* \*